Patented Jan. 13, 1942

2,269,555

UNITED STATES PATENT OFFICE 2,269,555

WELDING ROD

Robert M. Rooke, Jersey City, N. J., and Frederick C. Saacke, Astoria, Long Island, N. Y., assignors to Air Reduction Company, Incorporated, New York, N. Y., a corporation of New York No Drawing. Application October 11, 1940,
Serial No. 360,762

4 Claims. (Cl. 219—8)

This invention relates to welding rods such as are used in gas welding of ferrous metal parts.

It is an object of the invention to provide an improved low carbon steel welding rod. A more particular object of the invention is to provide a welding rod that combines the qualities of good weldability and high weld ductility in such relation as to be advantageous for various purposes, including use in the high speed welding processes employed in the production of automobile bodies.

In the mass production of bodies in the automobile industry, it is the practice to weld together plate edges with torch tips of sizes much larger than are used for ordinary welding operations. The large tips are used to obtain higher speed of welding, but it is difficult to produce consistent welds with such excessive heating and the use of ordinary low carbon steel welding rods, such rods having only moderately good weldability and being unable to withstand extensive over-heating without injurious effects on the weld metal.

Rods in which low carbon steel is alloyed with nickel are known, and such rods have good weldability. Objections to their use under circumstances such as presented by the automobile industry, are the higher welding rod cost and the tendency of welds made with an alloy steel welding rod to crack when the welds are made in constrained positions. The tendency of the weld metal to crack is due both to the degree of constraint or the amount of strain placed on the hot weld metal and insufficient ductility of the weld metal at elevated temperatures. High ductility seems to be the best guarantee that a constrained weld will not crack before it cools to room temperature.

We have discovered that the weldability of a low carbon steel welding rod can be improved by the addition of nickel in quantities insufficient to put the rod in the "alloy steel" classification, as the term "alloy steel" is usually understood. Although the ductility of weld metal obtained with nickel steel alloy welding rods such as disclosed in our Patent 2,150,785 is higher than that obtained with low carbon rods containing no consequential amount of nickel, use of the welding rods of this invention characterized by lower but functional nickel contents gives the unexpected result of still higher weld ductility.

Welding rods of this invention are less expensive than rods of higher nickel content, and are advantageous in operations for which an alloy steel rod, advantageous in other fields, is less suitable. Our improved welding rod is used in place of low carbon steel rods, and is itself a modified low carbon steel rod. These classifications are not absolutely fixed or necessarily determinative of the invention, which will be more fully described and defined hereinafter.

The paradoxical result obtained with this invention is thought to be the effect of a compromise between conflicting tendencies caused by the inclusion of nickel as a component of the welding rod. The addition of nickel improves the weldability; and this in turn contributes to more ductility in the weld, a probable reason being that whereas the turbulence that accompanies poor weldability, by exposing more metal to contact with the atmosphere, causes the formation of oxides and nitrides that reduce the ductility of the finished weld, reduction in turbulence has the contrary effect. On the other hand, the addition of nickel increases the air hardening properties of the steel, and thereby tends to increase the hardness and decrease the ductility of the finished weld.

Assuming these are conflicting factors, the new result of this invention can be explained on the theory that, as nickel content increases from a very low percentage, the beneficial effect of improved weldability on ductility increases more rapidly than the offsetting influence of the increased air hardening properties, up to a critical point, which naturally varies with the specific composition of the rod. However, as the nickel content is further increased there is proportionately less benefit from improved weldability, whereas the air hardening tendency continues to increase at a rate which makes the change in ductility reverse and go down instead of up.

For the purpose of this invention, we find that in a rod containing from .03% to .25% carbon, the nickel content should be between .25% and .70%. With the carbon near the lower end of its range, the percentage of nickel should be higher than when more carbon is present. It is preferable that the carbon and nickel be in such proportions that the product of the carbon content and the nickel content is not less than .02%.

For example, with a carbon content of about .05%, the nickel content is preferably between .4% and .7%. If the nickel content is raised above about .7%, the effect of the nickel as an alloying element becomes more pronounced, and causes the ductility of the weld to decrease. With a carbon content above .08%, the nickel content can be reduced to .25%, but smaller percentages of nickel are not sufficient to give the improved weldability that characterizes this invention.

Rods embodying this invention have the following composition:

|  | Per cent |
|---|---|
| Carbon | .03–.25 |
| Manganese | .15–.75 |
| Silicon | .05–.30 |
| Nickel | .25–.70 |
| Iron | Balance |
| Carbon and manganese, not over | .80 |

It will be understood, of course, that the metal of the rod will contain impurities that do not essentially alter the nature of the welding rod.

Comparative tests of welds made with low carbon rods containing no consequential amount of nickel and welds made with the rod of this invention bring out the increase in ductility. Further comparison with similar commercial rods of higher nickel content show in them a lower ductility.

The low carbon rods without nickel produced weld metal the average of which was capable of a 22% elongation in 2 inches. A comparable rod embodying this invention and having a nickel content of about .62% produced a weld with much greater ductility, average test results showing a 31% elongation in 2 inches. Commercial rods, otherwise comparable, but with an average nickel content of about 1.24% produce welds with considerably less ductility, test results showing an elongation of only 25% in 2 inches.

Although we prefer to use nickel, we have found that satisfactory results can be obtained with molybdenum used in place of the nickel. Not as much molybdenum can be used, however, the range being .05%–.30%, and the weldability is not improved as much by the addition of the molybdenum as by the addition of nickel.

The rod of this invention has qualities that are particularly valuable for welding bodies in automobile manufacture, but it is not limited to such use and can be employed advantageously for any welding where similar qualities in the weld metal are desirable.

We claim:

1. A low carbon welding rod comprising carbon .03–.25%, manganese .15–.75%, silicon .05–.30%, nickel .25–.70%, sum of carbon and manganese not over .80%, balance iron and incidental impurities.

2. A low carbon welding rod comprising carbon .03–.25%, manganese .15–.75%, silicon .05–.30%, nickel .25–.70%, balance iron and incidental impurities.

3. A low carbon welding rod comprising carbon .03–.25%, manganese .15–.75%, silicon .05–.30%, a metal from the group containing nickel and molybdenum in the amount of .25–.30%, balance iron and incidental impurities.

4. A low carbon welding rod comprising carbon .03–.25%, manganese .15–.75%, silicon .05–.30%, molybdenum .05–.30%, sum of carbon and manganese not over .80%, balance iron and incidental impurities.

ROBERT M. ROOKE.
FREDERICK C. SAACKE.